US011336141B2

(12) United States Patent
Watanabe et al.

(10) Patent No.: US 11,336,141 B2
(45) Date of Patent: May 17, 2022

(54) INSULATOR

(71) Applicant: YAMADA MANUFACTURING CO., LTD., Kiryu (JP)

(72) Inventors: Satoshi Watanabe, Kiryu (JP); Masahiko Hoshino, Kiryu (JP)

(73) Assignee: YAMADA MANUFACTURING CO., LTD., Kiryu (JP)

(*) Notice: Subject to any disclaimer, the term of this patent is extended or adjusted under 35 U.S.C. 154(b) by 205 days.

(21) Appl. No.: 16/738,308

(22) Filed: Jan. 9, 2020

(65) Prior Publication Data
US 2020/0313490 A1   Oct. 1, 2020

(30) Foreign Application Priority Data
Mar. 27, 2019  (JP) .............................. JP2019-60116

(51) Int. Cl.
*H02K 3/32* (2006.01)
*H02K 1/14* (2006.01)
(52) U.S. Cl.
CPC ............ *H02K 3/325* (2013.01); *H02K 1/146* (2013.01)
(58) Field of Classification Search
CPC ............................... H02K 1/146; H02K 3/325
USPC .................................................. 310/216.105
See application file for complete search history.

(56) References Cited

U.S. PATENT DOCUMENTS

| 4,583,696 A | 4/1986 | Mosher | |
| 9,154,010 B2* | 10/2015 | Yokogawa | H02K 3/522 |
| 9,209,658 B2* | 12/2015 | Haga | H02K 3/345 |
| 2006/0022549 A1* | 2/2006 | Otsuji | H02K 3/522 |
| | | | 310/216.001 |
| 2010/0156204 A1* | 6/2010 | Endo | H02K 3/522 |
| | | | 310/44 |
| 2013/0221770 A1* | 8/2013 | Yokogawa | H02K 1/148 |
| | | | 310/43 |

FOREIGN PATENT DOCUMENTS

| DE | 19818433 A1 | 11/1998 | |
| DE | 112007001231 T5 | 4/2009 | |
| DE | 102011078026 A1 | 12/2012 | |
| FR | 2992493 A1 | 12/2013 | |
| GB | 2325787 A * | 12/1998 | ............. H02K 29/03 |
| JP | 2004-140964 | 5/2004 | |

(Continued)

OTHER PUBLICATIONS

German Search Report dated Jan. 4, 2021, 8 pages.
Letter from Wolfgang Strobel of Kroher/Strobel Law Firm discussing German Search Report dated Jan. 20, 2021, 2 pages.

*Primary Examiner* — Alex W Mok
(74) *Attorney, Agent, or Firm* — Rankin, Hill & Clark LLP

(57) ABSTRACT

Guide portions that guide a winding include a plurality of guide grooves which is provided at each boundary between adjacent wind surfaces, and which is extended in a winding direction of the winding. The plurality of guide grooves is arranged side by side in a radial direction of a stator at an equal pitch. The guide groove provided at an arbitrary boundary among the boundaries is offset in the radial direction relative to the guide groove provided at the adjacent boundary at the opposite side to the winding direction with reference to an orthogonal direction to the radial direction of the motor stator. Respective offset directions and offset amounts of the guide grooves are consistent.

4 Claims, 8 Drawing Sheets

(56) References Cited

FOREIGN PATENT DOCUMENTS

| | | |
|---|---|---|
| JP | 4076837 B2 | 4/2008 |
| JP | 2010-279241 A | 12/2010 |
| WO | 2020/121806 A1 | 6/2020 |

* cited by examiner

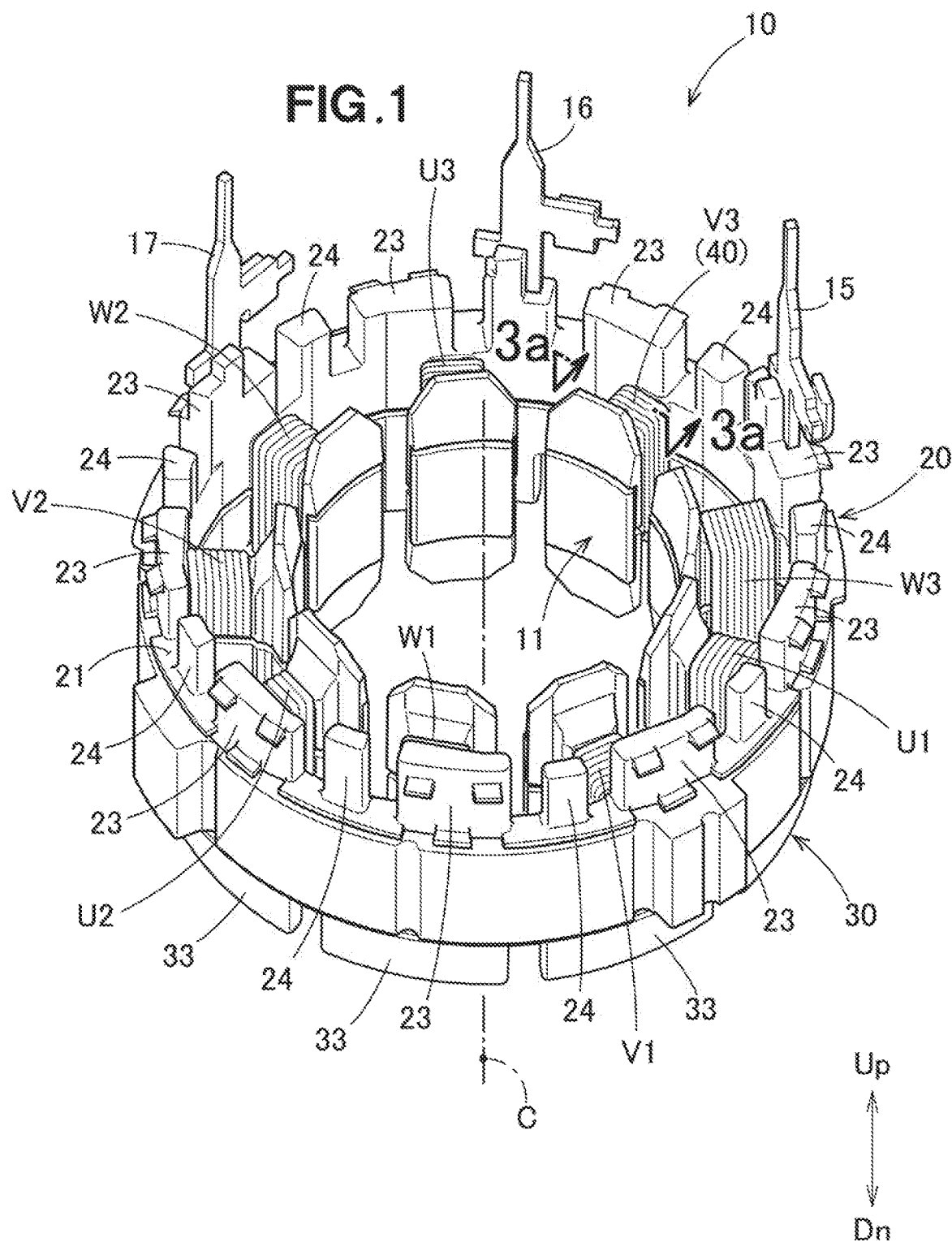

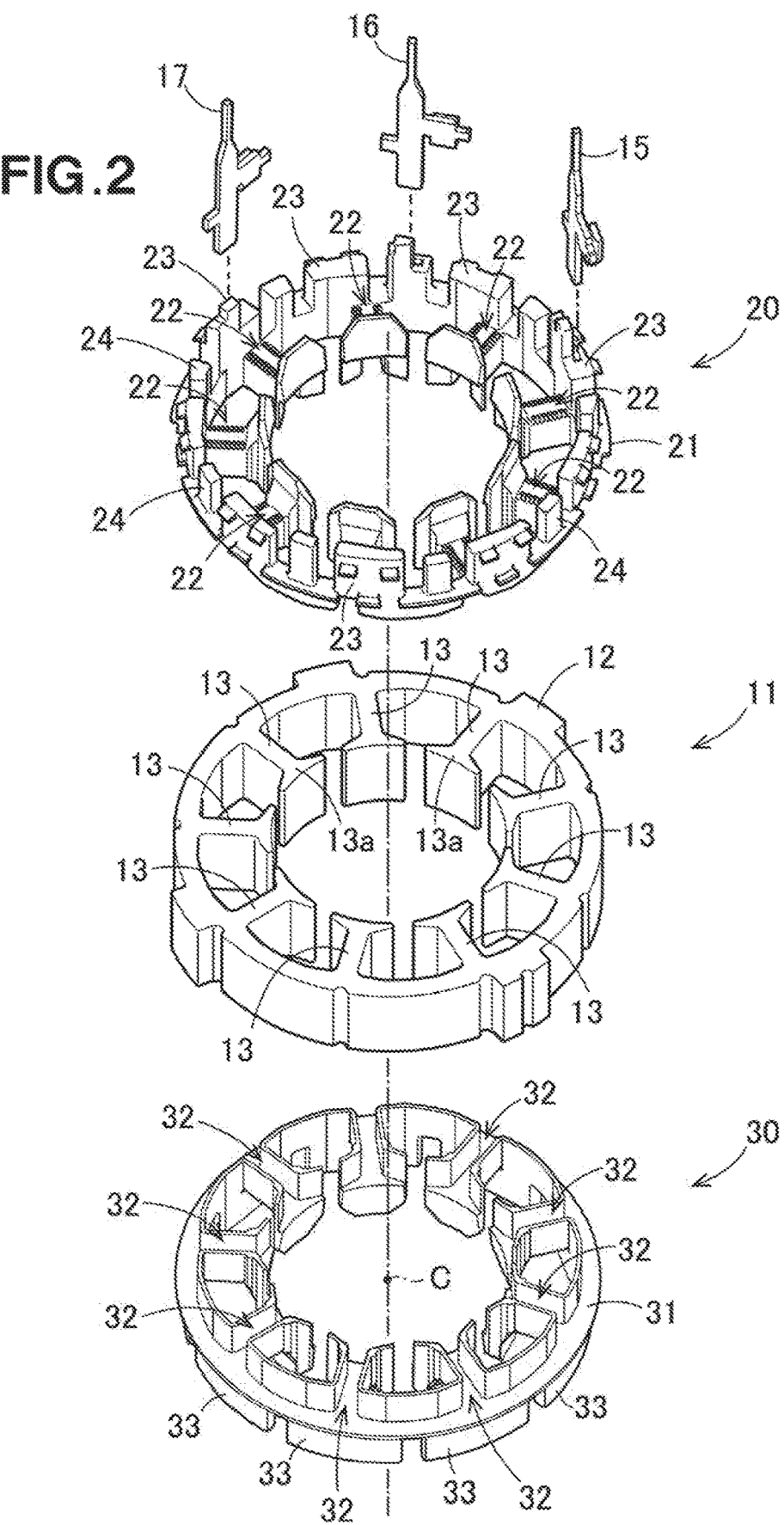

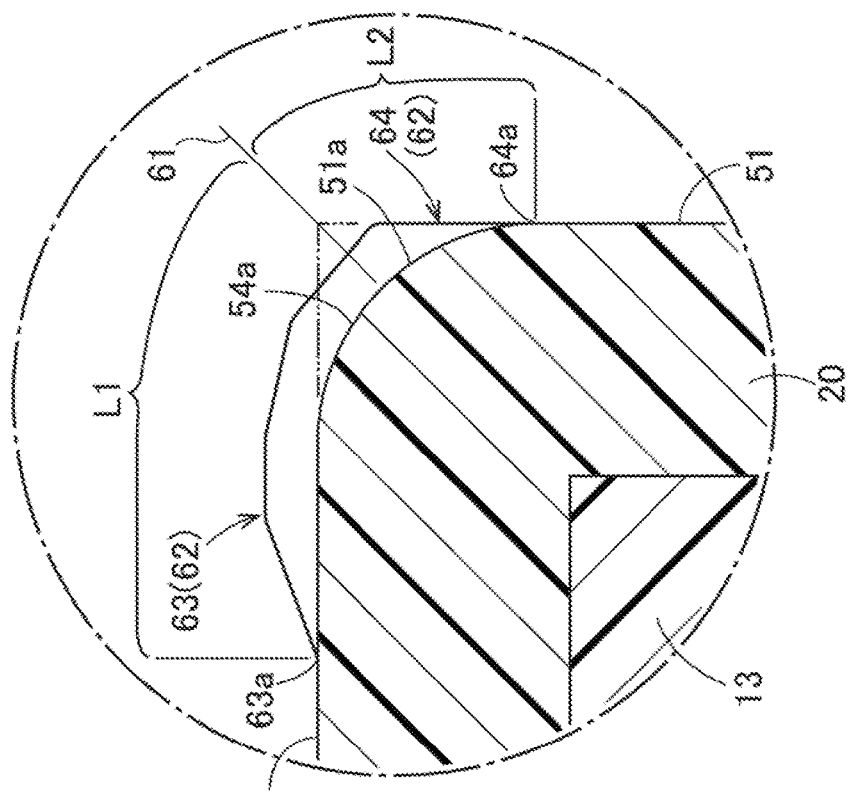
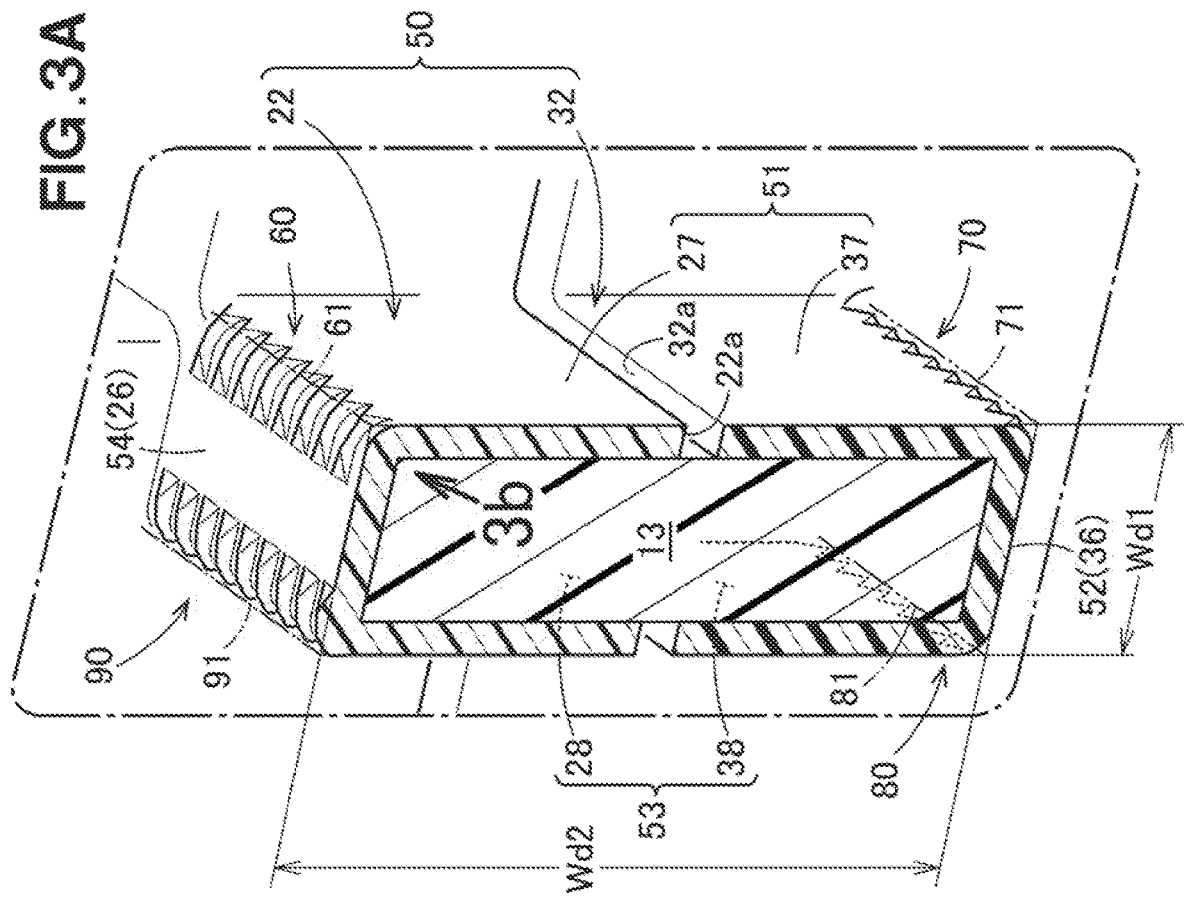
FIG.3A
FIG.3B

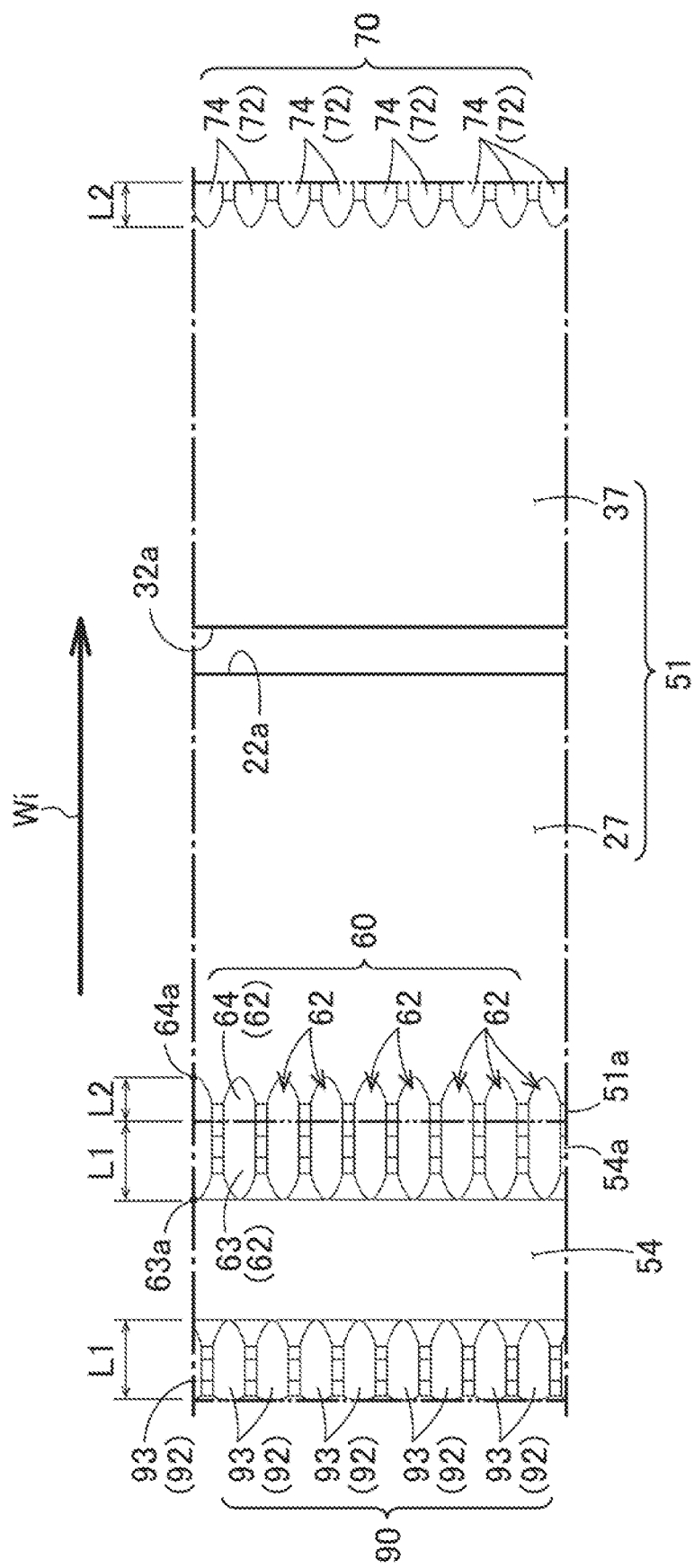

INSULATOR

FIELD OF THE INVENTION

The present disclosure relates to an insulator that has a guide groove capable of guiding a winding to be wound.

BACKGROUND

A motor stator includes a core that is formed by laminating magnetic steel sheets etc., and an insulator that is attached to this core. Japan Patent No. 4076837 B discloses a conventional technology regarding an insulator.

A motor disclosed in Japan Patent No. 4076837 B includes a plurality of teeth extended in an outer-diameter direction from an annular yoke. A cylindrical insulator is fitted and attached to each tooth.

A wind portion of the insulator where a winding can be wound has a rectangular cross-section, and has a surface that includes a first wind surface to a fourth wind surface. A plurality of guide grooves capable of guiding a winding to be wound is formed in the first wind surface to the third wind surface so as to be continuous across the first wind surface to the third wind surface. The guide grooves are extended in parallel with each other, and are orthogonal to a direction in which the insulator is fitted to the tooth. No guide groove is formed in the fourth wind surface.

[Patent Document 1] Japan Patent No. 4076837 B

When the winding is to be wound around the wind portion of the insulator by a winder, the winding that is drawn out from the nozzle of the winder is wound linearly along the guide grooves on the first to third wind surfaces.

In contrast, the winding is wound obliquely on the fourth wind surface. Accordingly, the winding is wound so as to be shifted to an adjacent row to the already-wound string of the winding. Likewise, the winding is wound linearly on the first to third wind surfaces, elongated obliquely on the fourth wind surface, and is shifted to the adjacent row.

The winding that is drawn out from the nozzle is bent on a boundary between the third wind surface and the fourth wind surface, and on a boundary between the fourth wind surface and the first wind surface. Hence, a load is applied on the winding at such boundaries.

SUMMARY OF THE INVENTION

An objective of the present disclosure is to provide a technology of reducing a load to be applied to a winding when the winding is wound around an insulator.

An insulator according to a first embodiment of the present disclosure includes a wind portion which covers at least a tooth of a core for a motor stator, and around which a winding is wound.

The wind portion includes: a plurality of wind surfaces; and a plurality of guide portions which is intermittently provided in the plurality of wind surfaces, and which is capable of guiding the winding to be wound.

Each of the plurality of guide portion is provided at a boundary between the adjoining wind surfaces, and includes a plurality of guide grooves which is extended in a winding direction of the winding and which is arranged side by side in a radial direction of the motor stator.

The guide groove provided at an arbitrary boundary among the boundaries is offset in the radial direction relative to the guide groove provided at the adjacent boundary at the opposite side to the winding direction with reference to an orthogonal direction to the radial direction of the motor stator.

Respective offset directions and offset amounts of the guide grooves are consistent.

According to a second embodiment of the present disclosure, preferably, the plurality of wind surface each includes: an end face directed in a direction along a center line of the motor stator; and a side face located adjacent to the end face and directed in a circumferential direction of the motor stator, and a width of the end face is narrower than a width of the side face with reference to the orthogonal direction.

According to a third embodiment of the present disclosure, preferably, when the plurality of guide grooves is divided into a first groove provided in the end face and a second groove provided in the side face, a dimension from the boundary to a tip of the first groove is longer than a dimension from the boundary to a tip of the second groove.

According to the above first embodiment, the winding portion of the insulator includes the plurality of wind surfaces, and the plurality of guide portions which is intermittently provided in the plurality of wind surfaces, and which is capable of guiding the winding to be wound. Each guide portion is provided at the boundary between the adjacent wind surfaces. Moreover, each guide portion includes the plurality of guide grooves which is extended in the winding direction of the winding and which is arranged side by side in the radial direction of the motor stator. That is, since the guide grooves are provided at both ends of each guide surface, respectively, in each wind surface, the winding can be guided so as to be directed from the guide groove at one end to the guide groove at another end.

The guide groove provided at an arbitrary boundary among the plurality of boundaries is to be compared with the guide groove provided at the adjacent boundary at the opposite side to the winding direction. The arbitrary guide groove is the guide groove at the end-point side of the winding (an end-point groove below). The adjacent guide groove is the guide groove at the start-point side of the winding (a start-point groove below). The end-point groove is offset relative to the start-point groove with reference to the orthogonal direction to the radial direction of the motor stator. Hence, the winding directed from the start-point groove to the end-point groove is extended obliquely to the orthogonal direction. The same is true of the adjacent guide grooves in the other wind surfaces.

In respective wind surfaces, the direction of the offset of the end-point groove and the offset amount thereof relative to the start-point groove are consistent. That is, in each wind surface, every time the winding is wound from the start-point groove to the end-point groove, the winding is gradually bent in either the outer-diameter direction or the inner-diameter direction.

In comparison with a case in which the winding is bent in only a surface among the plurality of wind surfaces, since the winding is gradually bent, a load to be applied to the winding can be reduced.

According to the above second embodiment of the present disclosure, the plurality of wind surface each includes: the end face directed in the direction along the center line of the motor stator; and the side face located adjacent to the end face and directed in a circumferential direction of the motor stator. The width of the end face is narrower than the width of the side face with reference to the orthogonal direction to the radial direction of the motor stator. Hence, when the winding wound around the end face is compared with the winding wound around the side face, the winding wound around the side face has a smaller angle to the orthogonal direction.

When the winding wound around the end face is compared with the winding wound around the side face, the intersection angle between the winding string at the first stage wound around the side face and the winding string at the second stage becomes small. When in general, the winding strings that have a small intersection angle are laid over, the winding string at the upper stage is likely to be placed between the adjacent winding strings at the lower stage. When the number of stages increases, the height of the winding wound around the side face becomes lower than the height of the winding wound around the end face. Consequently, the space factor increases, and thus the thickness dimension of the coil in the circumferential direction can be reduced. Therefore, the motor stator can be downsized.

According to the above third embodiment of the present disclosure, the plurality of guide grooves is divided into a first groove provided in the end face and a second groove provided in the side face. The dimension from the boundary to the tip of the first groove is longer than the dimension from the boundary to the tip of the second groove. Accordingly, the winding at the end-face side which is extended obliquely to the orthogonal direction can be surely held.

BRIEF DESCRIPTION OF THE DRAWINGS

FIG. 1 is a perspective view illustrating a motor stator according to an embodiment;

FIG. 2 is an exploded perspective view of the motor stator illustrated in FIG. 1;

FIG. 3A is a cross-sectional view taken along a line 3a-3a in FIG. 1, and FIG. 3B is a diagram as viewed along a line 3b;

FIG. 4 is an exploded view of a first wind surface and a second wind surface both in a wind portion illustrated in FIG. 3A;

DETAILED DESCRIPTION OF THE EMBODIMENTS

Figure 5:
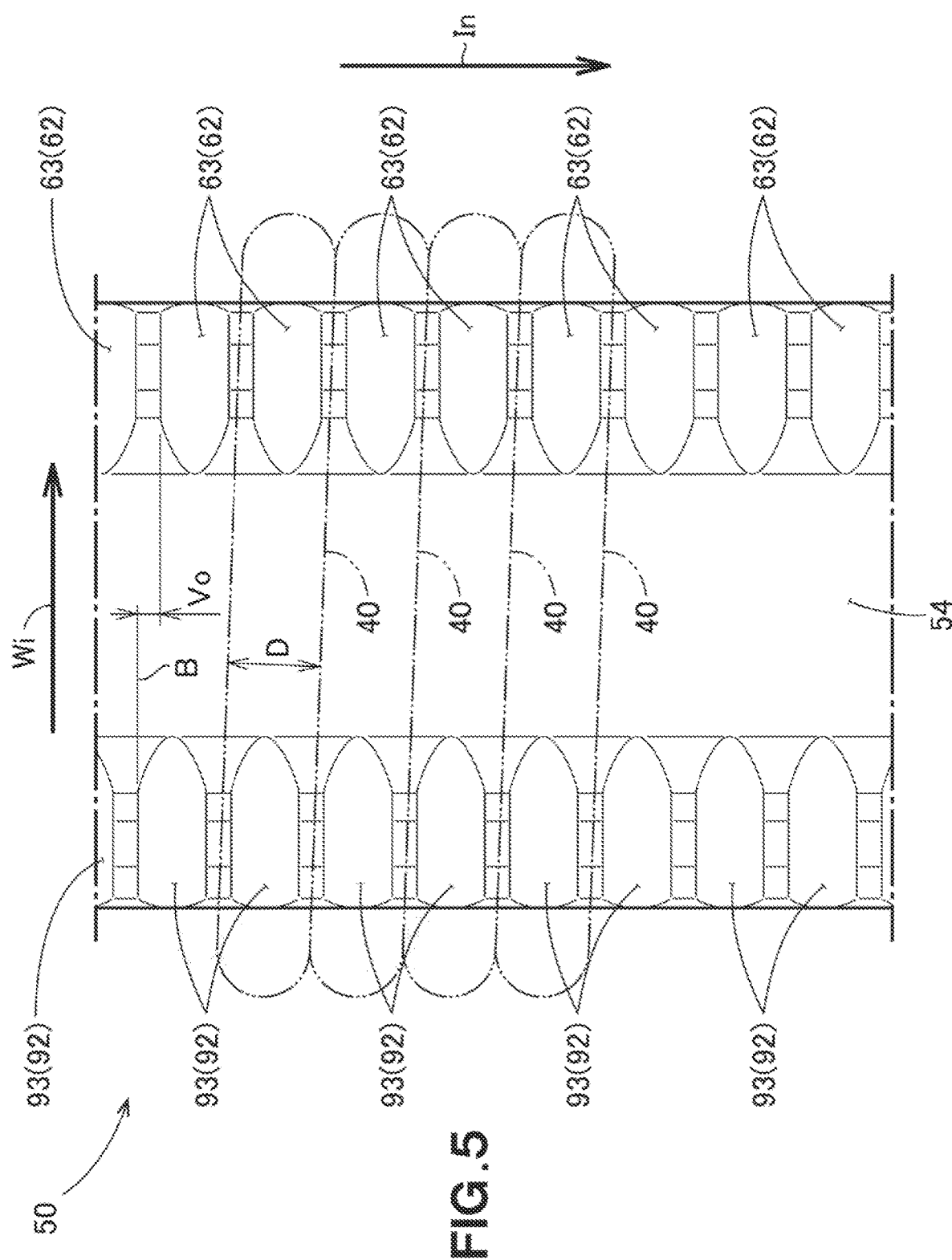
FIG. 5 is a plan view of a part of a fourth wind surface.

Embodiments will be described below with reference to the accompanying drawings. Note that, in the following description, an inner-diameter direction, an outer-diameter direction, a circumferential direction, and an axial direction (a vertical direction) are defined with reference to a center line C of a motor stator. A reference numeral to be given to a component in the same shape will be omitted as appropriate.

With reference to FIG. 1 and FIG. 2, FIG. 1 illustrates a motor stator 10 according to an embodiment. This motor stator 10 includes a core 11 formed by a large number of laminated magnetic steel sheets, a first insulator 20 that covers the upper portion of this core 11, and a second insulator 30 that covers the lower portion of the core 11, first coils U1, V1, and W1, second coils U2, V2, and W2, and third coils U3, V3, and W3 that are provided between the first insulator 20 and second insulator 30, and a first terminal 15 to a third terminal 17 that are attached to the first insulator 20.

With reference to FIG. 2, the core 11 includes an annular yoke 12, and nine teeth 13 extended in the inner-diameter direction from the yoke 12. Each tip 13a of each tooth 13 has a width that increases toward the inner-diameter direction.

The first insulator 20 includes a first annular member 21 capable of covering the upper portion of the yoke 12, nine first wind portions 22 capable of covering respective upper halves of the teeth 13, nine first elongated-wall portions 23 (extended portions) which are extended upwardly along the axial direction of the first annular member 21 and which are intermittently provided in the circumferential direction, and nine short-wall portions 24 each provided between the adjacent first elongated-wall portions 23 and having a shorter dimension in the circumferential direction than that of the first elongated-wall portion 23.

The second insulator 30 includes a second annular member 31 capable of covering the lower portion of the yoke 12, nine second wind portions 32 capable of covering respective lower halves of the teeth 13, and nine second wall portions 33 that are extended downwardly along the axial direction from the second annular member 31.

A structure of a portion around which a winding 40 (see FIG. 1) that forms the coil V3 is wound in the first insulator 20 and in the second insulator 30 will be described below. This description also describes a portion around which the other coil is wound. A description on the wire connection of the winding 40 will be omitted.

With reference to FIG. 3A, the first wind portion 22 and the second wind portion 32 form a wind portion 50 around which the winding 40 (see FIG. 1) is wound. The first wind portion 22 and the second wind portion 32 each have a U-shaped cross-sectional shape. A tip 22a of the first wind portion 22 at the opening side and a tip 32a of the second wind portion 32 at the opening side face with each other but slightly apart from each other.

Note that in the embodiment, although the two wind portions 22 and 32 are combined with each other, depending on, for example, the shape of the core 11 (see FIG. 2), a single wind portion that can be fitted on the tooth 13 may be formed.

An upper surface 26 of the first wind portion 22 and a pair of first right surface 27 and first left surface 28 both extended downwardly from the both ends of the upper surface 26, respectively, are surfaces to be in contact with the winding 40. Likewise, a lower surface 36 of the second wind portion 32, and a pair of second right surface 37 and second left surface 38 extended upwardly from both ends of the lower surface 36, respectively, are surfaces to be in contact with the winding 40.

In order to facilitate understanding, a surface that includes the first right surface 27 and the second right surface 37 will be defined as a first wind surface 51 (side face). Likewise, the lower surface 36 will be defined as a second wind surface 52 (end face), a surface that includes the first left surface 28 and the second left surface 38 will be defined as a third wind surface 53 (side face), and the upper surface 26 will be defined as a fourth wind surface 54 (end face). The first wind surface 51 and the third wind surface 53 are directed oppositely to each other in the circumferential direction. The second wind surface 52 is directed downwardly. The fourth wind surface 54 is directed upwardly. The winding 40 is wound clockwise, i.e., in the sequence from the first wind surface 51 to the fourth wind surface 54.

With reference to an orthogonal direction that is orthogonal to the radial direction, the second wind surface 52 has a shorter width Wd1 (a dimension in the horizontal direction) than a height Wd2 (a dimension in the vertical direction) of the third wind surface 53.

The wind portion 50 includes a first guide portion 60 to a fourth guide portion 90 capable of guiding the winding 40 to be wound.

With reference to FIG. 3B, the first guide portion 60 is provided in both surfaces that include a first boundary 61 between the fourth wind surface 54 and the first wind surface 51 adjacent to each other.

The second guide portion 70 to the fourth guide portion 90 also employ the same structure. The second guide portion 70 is provided in both surfaces that include a second boundary 71 between the first wind surface 51 and the second wind surface 52 adjacent to each other. The third guide portion 80 is provided in both surfaces that include a third boundary 81 between the second wind surface 52 and the third wind surface 53 adjacent to each other. The fourth guide portion 90 is provided in both surfaces that include a fourth boundary 91 between the third wind surface 53 and the fourth wind surface 54 adjacent to each other.

FIG. 4 illustrates exploded fourth wind surface 54 and first wind surface 51. The first guide portion 60 includes a plurality of first guide grooves 62 which is extended in the winding direction (see an arrow Wi) of the winding 40 and which is arranged side by side at an equal pitch in the radial direction.

With reference to FIG. 3B and FIG. 4, the first guide groove 62 is divided into a first groove 63 provided in an end portion 54a of the fourth wind surface 54 (end face), and a second groove 64 provided in an end portion 51a of the first wind surface 51 (side face). A dimension L1 from the first boundary 61 to a tip 63a of the first groove 63 is longer than a dimension L2 from the first boundary 61 to a tip 64a of the second groove 64.

With reference to FIG. 3A and FIG. 4, the second guide groove 70 to the fourth guide groove 90 are also formed by the grooves in the same shape as that of the first guide groove 62. Respective lengths of the guide grooves facing with each other in each surface in the winding direction is consistent with each other. For example, in the fourth guide groove 92, a dimension of a first groove 93 provided in the fourth wind surface 54 is L1. In the second guide groove 72, a dimension of a second groove 94 provided in the first wing surface 51 is L2. The descriptions for respective dimensions of the other guide grooves are omitted.

FIG. 5 illustrates a part of the fourth wind surface 54 as viewed from the top along the axial direction. The first guide groove 62 is offset in the inner-diameter direction relative to the fourth guide groove 92 located at the opposite side to the winding direction (see an arrow Wi) with reference to the orthogonal direction (see a reference line B) to the inner-diameter direction (see an arrow In). An offset amount Vo is ¼ of a wire diameter D of the winding 40. That is, the first guide groove 62 that becomes an end point of the winding direction is offset in the inner-diameter direction relative to the second guide groove 72 that becomes a start point. The guide grooves in the first wind surface 51 to the third wind surface 53 employ the same structure. This will be described in detail below.

Figure 6:
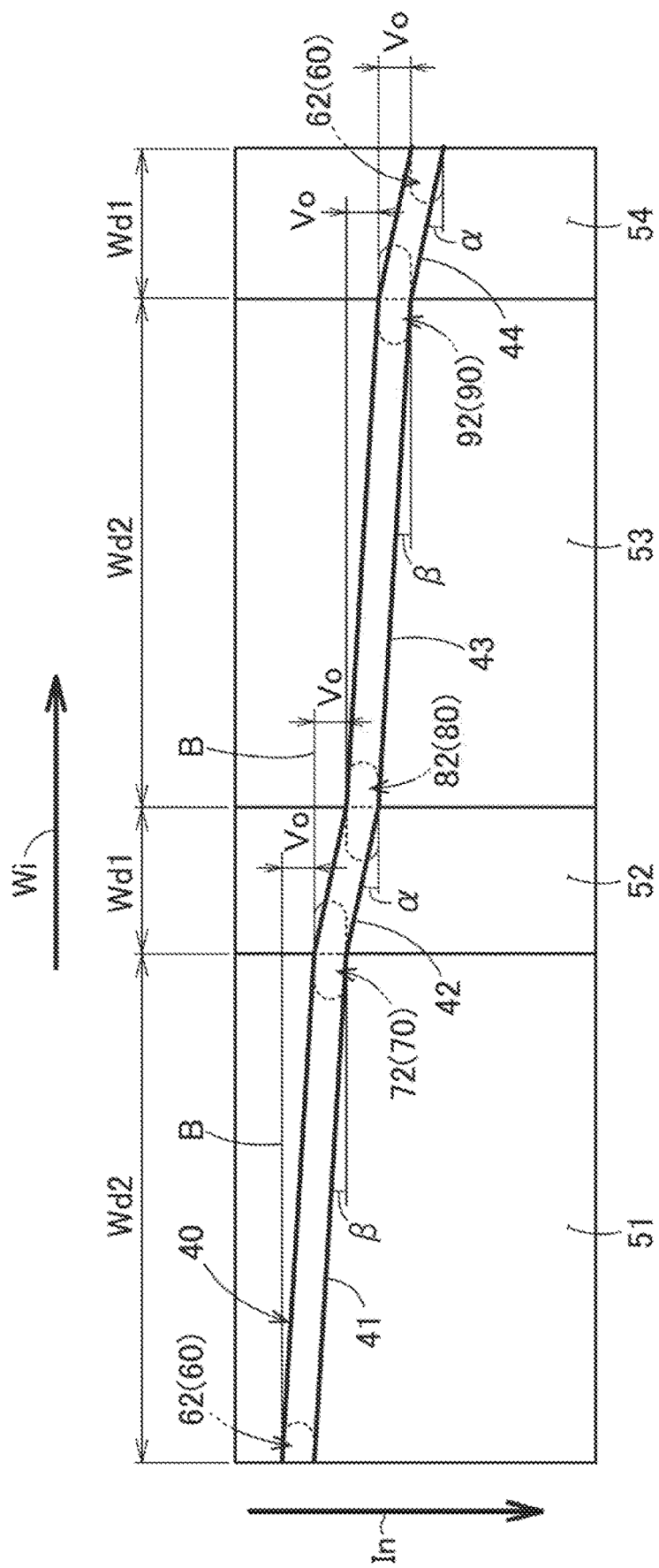
FIG. 6 is a diagram for describing a winding that is wound around the first wind surface to the fourth wind surface.

FIG. 6 is an exemplarily exploded view of the first wind surface 51 to the fourth wind surface 54. The first guide portion 60 to the fourth guide portion 90 can be considered as being intermittently provided in the winding direction (see the arrow Wi). A portion of the winding 40 wound around the first wind surface 51 will be defined as a first winding 41. A second winding 42 to a fourth winding 44 will be likewise defined.

The second guide groove 72 is offset in the inner-diameter direction relative to the first guide groove 62 located at the opposite side to the winding direction. An offset amount Vo is ¼ of the wire diameter D of the winding 40 (see FIG. 5). The third guide groove 82 is offset in the inner-diameter direction relative to the second guide groove 72 located at the opposite side to the winding direction. An offset amount Vo is ¼ of the wire diameter of the winding 40. The fourth guide groove 92 is offset in the inner-diameter direction relative to the third guide groove 82 located at the opposite side to the winding direction. An offset amount Vo is ¼ of the wire diameter of the winding 40.

As described above, the offset directions of the first guide groove 62 to the fourth guide groove 92 are all in the inner-diameter direction. Moreover, the respective offset amounts Vo of the first guide groove 62 to the fourth guide groove 92 are consistent with each other, and are equal to ¼ of the wire diameter D.

Next, advantageous effects of this embodiment will be described.

With reference to FIG. 5 and FIG. 6, the first guide groove 62 is offset in the inner-diameter direction relative to the fourth guide groove 92 located at the opposite side to the winding direction. Hence, the winding 40 that is directed from the fourth guide groove 92 to the first guide groove 62 is obliquely elongated in the inner-diameter direction side relative to the orthogonal direction.

Similarly, the second guide groove 72 is offset in the inner-diameter direction relative to the first guide groove 62 located at the opposite side to the winding direction. The offset amount Vo2 is substantially ¼ of the wire diameter of the winding 40. The third guide groove 82 is offset in the inner-diameter direction relative to the second guide groove 72 located at the opposite side to the winding direction. The offset amount Vo3 is substantially ¼ of the wire diameter of the winding 40. The fourth guide groove 92 is offset in the inner-diameter direction relative to the third guide groove 82 located at the opposite side to the winding direction. The offset amount Vo4 is substantially ¼ of the wire diameter of the winding 40.

That is, in each wind surface, every time the winding 40 is wound from the guide groove which is a start point to the guide groove which is an end point, the winding 40 is gradually directed in the inner-diameter direction. Each offset amount is smaller than the wire diameter.

Figure 7A:
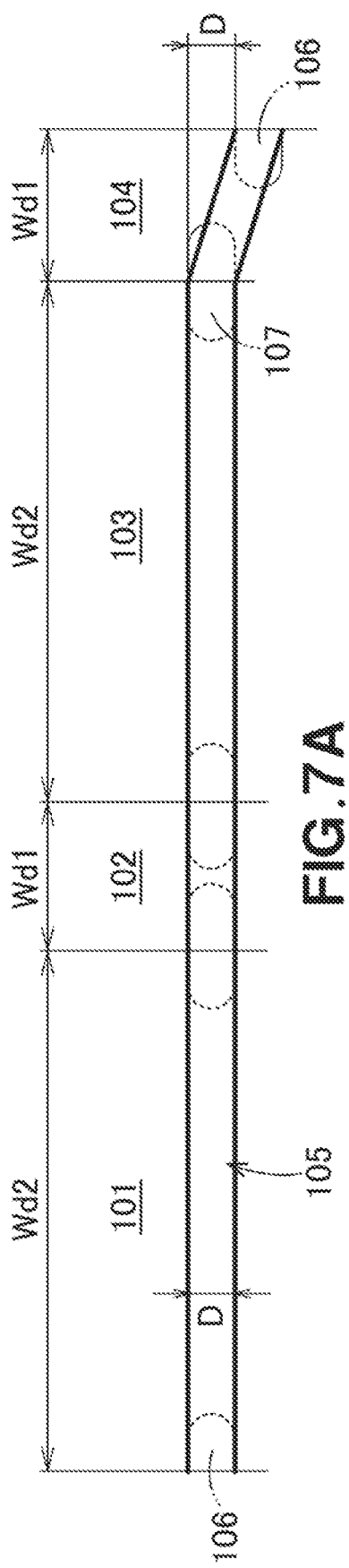
FIG. 7A is a diagram for describing a winding that is wound around the first wind surface to the fourth wind surface according to a comparative example.

With reference to FIG. 7A, according to a comparative example, at a first wind surface 101 to a third wind surface 103, a winding 105 is wound linearly. Only in a fourth wind surface 104, a guide groove 106 that becomes an end point is offset relative to a guide groove 107 that becomes a start point. An offset amount Vo is equal to a wire diameter D.

Figure 7B:
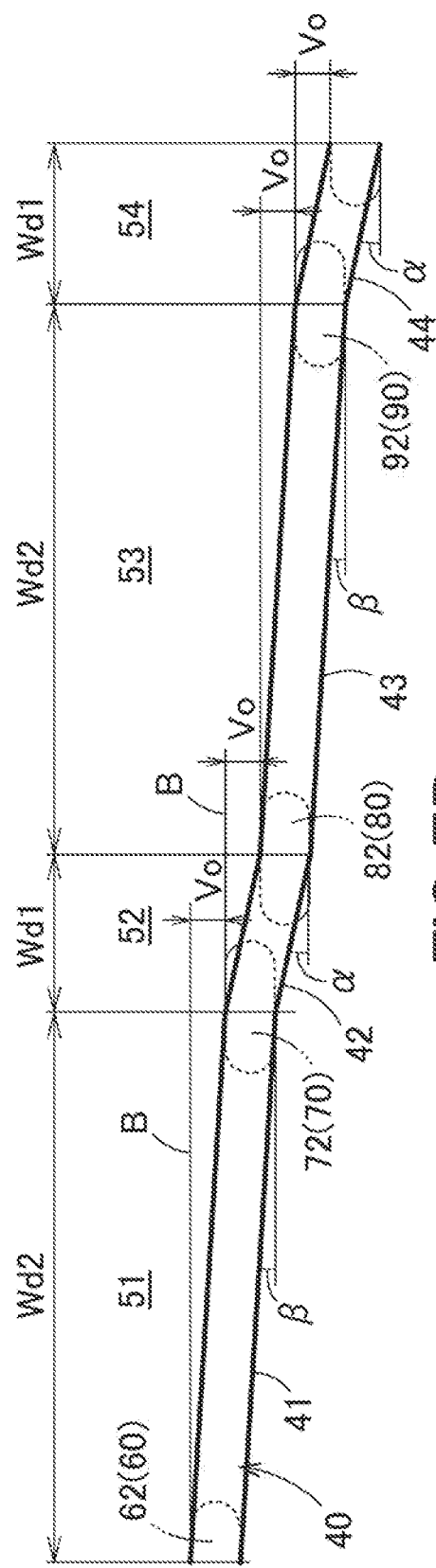
FIG. 7B is a diagram for describing a winding that is wound around the first wind surface to the fourth wind surface according to a comparative example.

With reference to FIG. 7B, according to the embodiment, each offset amount Vo is smaller than a wire diameter D. That is, since the winding 40 is bent gradually in the inner-diameter direction at each wind surface, a load to be applied to the winding 40 can be distributed.

Moreover, as described above, the guide grooves are intermittently provided in respective boundaries. In comparison with the guide grooves which are continuously provided across the entire four wind surfaces, manufacturing costs for metal molds can be suppressed, and the productivity of the insulator can be improved.

With reference to FIG. 3A and FIG. 6, the width Wd1 of the second wind surface 52 is narrower than the width Wd2 of the first wind surface 51. Moreover, the respective offset amounts of the guide grooves are all Vo. Hence, an angle α by the second winding 42 relative to a parallel line to the reference line B is greater than an angle β by the first winding 41.

Figure 8B:
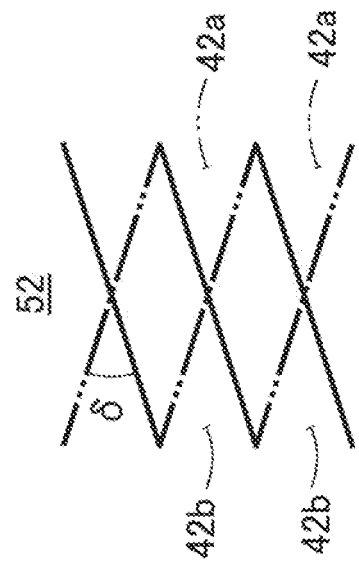
FIG. 8A and FIG. 8B are diagrams for describing the winding that is wound around the first wind surface at a first stage and at a second stage, and, FIG. 8C and FIG. 8D are diagrams for describing the winding that is wound around the second wind surface at a first stage and at a second stage.
Figure 8D:
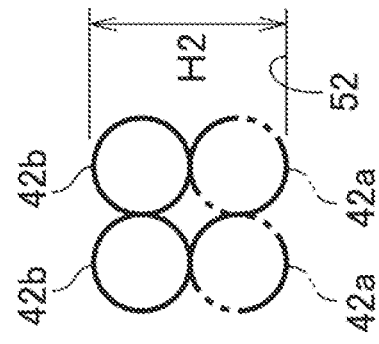
Figure 8A:
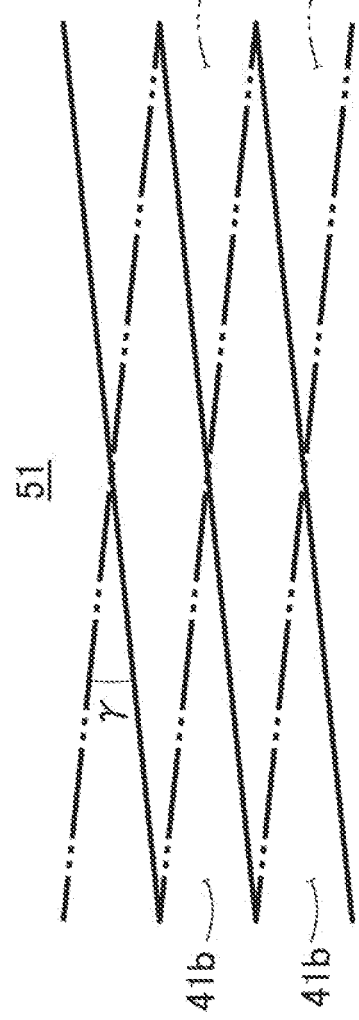

FIG. 8A illustrates, among the first winding 41 that is wound around the first wind surface 51, a first-stage winding 41a and a second-stage winding 41b. FIG. 8B illustrates, among the second winding 42 that is wound around the second wind surface 52, a first-stage winding 42a and a second-stage winding 42b. An angle γ at which the respective first windings 41a and 41b intersect is smaller than an angle δ at which the respective second windings 42a and 42b intersect.

Figure 8C:
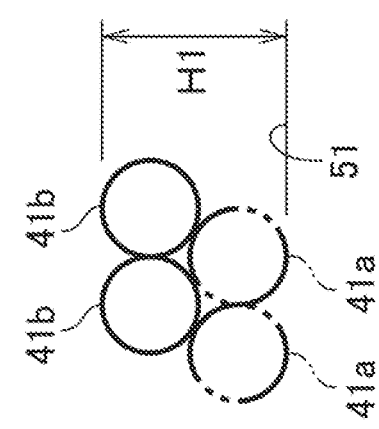

In general, when a winding that has a small intersection angle is laminated, the winding string at the upper stage is slightly embedded in adjoining strings of the winding at the lower stage, thus being facilitated for placement. That is, the winding string at the upper stage is embedded in adjoining strings of the winding at the lower stage, and is placed so as to be supported by the winding strings at the lower stage. Hence, a height H1 (see FIG. 8C) of the first winding 41 that is wound around the first wind surface 51 becomes lower than a height H2 of the winding 42 that is wound around the second wind surface 52 (see FIG. 8D).

Consequently, the space factor increases, and since the thickness of the coil V3 (see FIG. 1) in the circumferential direction can be made shorter than the thickness in the axial direction, the motor stator 10 can be downsized.

With reference to FIG. 3B and FIG. 4, the dimension L1 from the first boundary 61 to the tip 63a of the first groove 63 is longer than the dimension L2 from the first boundary 61 to the tip 64a of the second gap 64.

With reference to FIG. 6, the angle α by the second winding 42 is greater than the angle (3 by the first winding 41. This enables the winding 40 guided in the internal-diameter direction at a further large angle to be surely held.

Note that although the dimension in which the single portion of winding 40 matches the single guide groove in this embodiment, a dimension in which, for example, the plural portions of the winding 40 match the single guide groove by increasing the width of such a groove may be employed. Moreover, for an insulator that has the wind portion extended in the outer-diameter direction, the structure of the wind portion 50 is applicable. That is, the present disclosure is not limited to the above-described embodiment as long as the actions and advantageous effects of the present disclosure are achievable.

What is claimed is:

1. An insulator comprising a wind portion which covers at least a tooth of a core for a motor stator, and around which a winding is wound,
wherein the wind portion comprises: a plurality of wind surfaces and a plurality of guide portions, the plurality of wind surfaces comprise: first and second end faces and first and second side faces, each of the first and second end faces being directed in a direction along a center line of the motor stator and each of the first and second side faces being located adjacent to and between the first and second end faces and being directed in a circumferential direction of the motor stator; each of the plurality of guide portions is capable of guiding the winding to be wound and is provided between adjacent wind surfaces such that adjacent guide portions are spaced apart from one another by an intervening wind surface,
wherein each of the plurality of guide portions is provided at a boundary between one of the first and second end faces and an adjacent one of the first and second side faces, and comprises a plurality of guide grooves which extend in a winding direction of the winding and which are arranged side by side in a radial direction of the motor stator,
wherein the guide groove provided at an arbitrary boundary among the boundaries is offset in the radial direction relative to the guide groove provided at an adjacent boundary at an opposite side to the winding direction with reference to a direction orthogonal to the radial direction of the motor stator, and
wherein respective offset directions and offset amounts of the guide grooves are consistent between guide portions provided at adjacent boundaries.

2. The insulator according to claim 1, wherein:
a width of the end face is narrower than a width of the side face with reference to the orthogonal direction.

3. An insulator comprising a wind portion which covers at least a tooth of a core for a motor stator, and around which a winding is wound,
wherein the wind portion comprises: a plurality of wind surfaces; and a plurality of guide portions which is intermittently provided in the plurality of wind surfaces, and which is capable of guiding the winding to be wound,
wherein each of the plurality of guide portions is provided at a boundary between the adjoining wind surfaces, and comprises a plurality of guide grooves which is extended in a winding direction of the winding and which is arranged side by side in a radial direction of the motor stator,
wherein the guide groove provided at an arbitrary boundary among the boundaries is offset in the radial direction relative to the guide groove provided at the adjacent boundary at the opposite side to the winding direction with reference to an orthogonal direction to the radial direction of the motor stator,
wherein respective offset directions and offset amounts of the guide grooves are consistent, and
wherein when the plurality of guide grooves is divided into a first groove provided in the end face and a second groove provided in the side face, a dimension from the boundary to a tip of the first groove is longer than a dimension from the boundary to a tip of the second groove.

4. The insulator according to claim 3, wherein:
the plurality of wind surface each comprises: an end face directed in a direction along a center line of the motor stator; and a side face located adjacent to the end face and directed in a circumferential direction of the motor stator; and
a width of the end face is narrower than a width of the side face with reference to the orthogonal direction.

* * * * *